_(12)_ United States Patent
Yeung et al.

(10) Patent No.: US 9,354,859 B2
(45) Date of Patent: May 31, 2016

(54) EFFICIENTLY UPDATING MULTIPLE DEVICES ON A PRIVATE NETWORK

(71) Applicants: Toshiba Tec Kabushiki Kaisha, Tokyo (JP); Kabushiki Kaisha Toshiba, Tokyo (JP)

(72) Inventors: Michael Yeung, Mission Viejo, CA (US); Jianxin Wang, Trabuco Canyon, CA (US); Sheng Lee, Irvine, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/292,179

(22) Filed: May 30, 2014

(65) Prior Publication Data

US 2015/0347118 A1 Dec. 3, 2015

(51) Int. Cl.
*G06F 9/445* (2006.01)

(52) U.S. Cl.
CPC ....................................... *G06F 8/65* (2013.01)

(58) Field of Classification Search
None
See application file for complete search history.

(56) References Cited

U.S. PATENT DOCUMENTS

2011/0209138 A1* 8/2011 Monteith et al. .............. 717/172

\* cited by examiner

*Primary Examiner* — Chuck Kendall
(74) *Attorney, Agent, or Firm* — SoCal IP Law Group LLP; Steven C. Sereboff; Jonathan Pearce (57) ABSTRACT

Systems and methods for a device connected to a private network to efficiently retrieve a software/firmware update. The device may retrieve an update scheme that defines an external Uniform Resource Identifier (URI) for a resource external to the private network and a primary URI for a primary resource connected to the private network. The device may compare own Internet Protocol address and the primary URI to determine whether or not the device is the primary resource. When the device is the primary resource, the device may retrieve the software/firmware update from the external URI.

20 Claims, 5 Drawing Sheets

FIG. 5

EFFICIENTLY UPDATING MULTIPLE DEVICES ON A PRIVATE NETWORK

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to user interfaces for mobile devices used in conjunction with multifunction peripherals.

2. Description of the Related Art

A document processing device performs a document processing function such as print, copy, scan and fax. A multifunction peripheral (MFP) is a type of document processing device which is an integrated device providing at least two document processing functions. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together are a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's local area networks which may also include various workstations, servers, and other peripherals. Such networks may include multiple MFPs f the same or different types.

The function performed by an MFP may rely upon firmware and/or software stored within the MFP. This firmware and/or software may be updated during the operational life of the MFP. Updating of MFP firmware and/or software has traditionally been done by manually connecting a portable storage device, such as a USB memory or compact disc, to each MFP. In this document the term "software/firmware update" means an update of the software, firmware, or both software and firmware within a device.

MFPs connected to a communications network may receive or request software/firmware updates via the network. Software/firmware updates may be transferred from a server to the MFP by either a "push method" or a "pull method".

With the push method, the server initiates and controls the communications and effectively "pushes" software/firmware updates to the MFP. With the pull method, the MFP initiates and controls the communications and effectively "pulls" software/firmware updates from the server. However, updating an MFP connected to a corporate or other real or virtual private network from a server external to the private network using the push method may be achieved only if the private network administrator allows the server to have VPN (virtual private network) access or a dedicated IP/port to tunnel into the private network. Private network administrators are commonly reluctant to allow any external device to have VPN access or direct IP/port access. Further, updating multiple MFPs on a private network using the push method requires the server to push the same firmware files, which are typically hundreds of MB or GB in size, to each MFP. This creates unnecessary traffic through a gateway between the private network and the network external to the private network.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

This document describes systems and processes using a pull method for software/firmware updates. Although all of the examples in this document are directed to updating the software/firmware of MFPs, the system and method may be used to update the firmware/software of other types of client devices. An MFP initiates communication with pre-defined URI (uniform resource identifier) where the firmware/software update may be stored at a pre-define scheduled. If a software/firmware update is available, then the MFP will pull the software/firmware update and initiate its installation. Using the pull method for software/firmware updates circumvents the need for a private network administrator to allow an external device to have specific IP/Port or VPN access, and may not require changes to the gateway between the private network and the external network.

If a private network contains multiple MFPs, one or more MFPs may be designated as "primary" MFPs and assigned responsibility for pulling software/firmware updates for the server external to the private network. Other MFPs on the private network may be designated as "secondary" MFPs that retrieve software/firmware updates from a primary MFP or a shared resource within the private network.

Description of Apparatus

Figure 1:
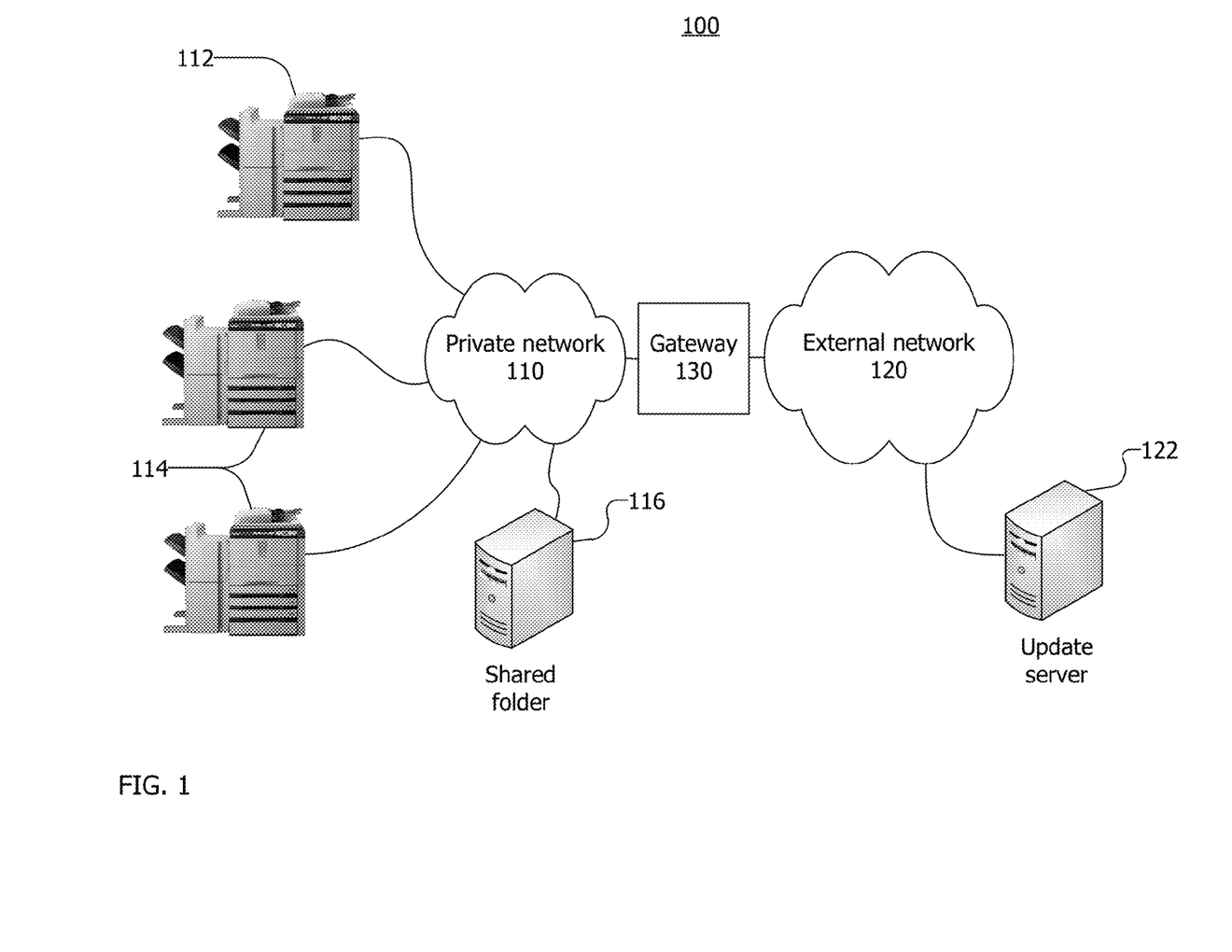
FIG. 1 is a diagram of an MFP system.

Referring now to FIG. 1 there is shown an MFP system 100. The system 100 includes a private network 110 and an external network 120 connected through a gateway 130. The private network 110 may be, for example, a corporate local area network, a personal area network, or some other real or virtual private network. The external network 120 may be a local area network, a wide area network, a mobile or telephone network, the Internet, an intranet, or any combination of these. The private network 110 and the external network 120 may have physical layers and transport layers according to IEEE 802.11, Ethernet, or other wireless or wire-based communication standards and protocols such as WiMAX®, Bluetooth®, mobile telephone and data protocols, the public switched telephone network, a proprietary communications network, infrared, and optical. The private network 110 and the external network 120 may use the same or different communications protocols.

The gateway 130 may control and convey communications between the private network 110 and the external network 120. The gateway 130 may be or include a firewall to prevent unauthorized or unwanted communications between the private and external networks.

The private network 110 may include, or be connected to, one or more MFPs. At least one MFP may be designated as a primary MFP. Other MFPs (i.e. MFPs not designated as primary) may be designated as secondary MFPs. In the example of FIG. 1, MFP 112 is designated as the primary MFP and two MFPs 114 are designated as secondary MFPs. Each MFP may be designated as primary or secondary by, for example, an administrator of the private network 110. The designation of each MFP as primary or secondary may be arbitrary and does not imply or require any difference in the hardware, software, or firmware of the primary and second MFPs.

The private network 110 may also include, or be connected to, an optional computing device that stores a shared folder 116 that is accessible to multiple MFPs 112, 114 on the private network.

The external network 120 may include, or be connected to, a real or virtual update server 122 that stores firmware/software updates for the MFPs 112, 114. The update server 122 may be implemented by software operating on a server computer connected to the external network 120. The external network 120 may include, or be connected to, numerous other devices (not shown) in addition to the update server 122.

Figure 2:
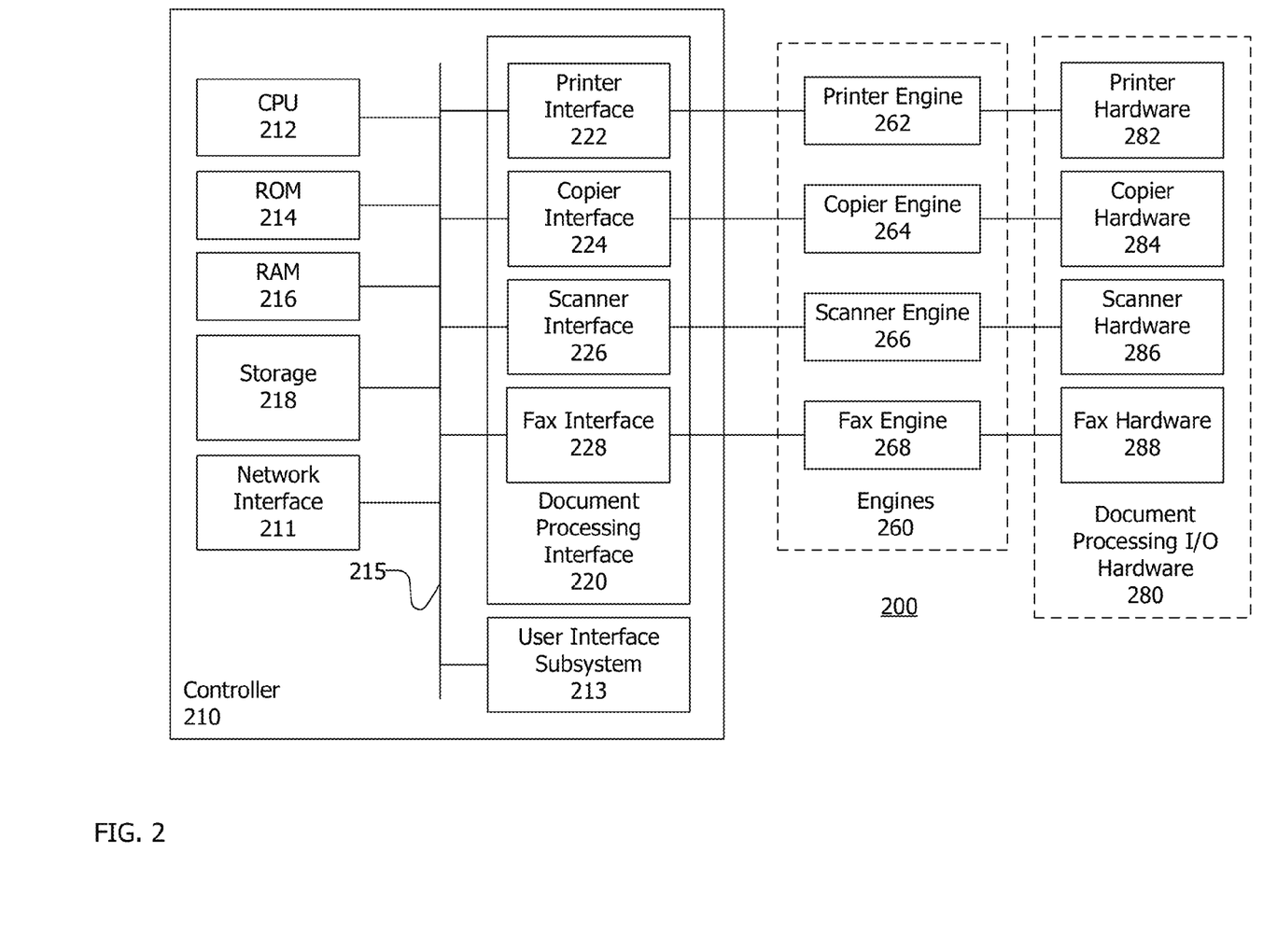
FIG. 2 is a block diagram of an MFP.

FIG. 2 is a block diagram of an MFP 200 which may be any of all the MFPs 112, 114 of FIG. 1. The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2, there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 102 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously. However, the MFP 200 may be controlled from and provide output to the user interface subsystem 213.

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Figure 3:
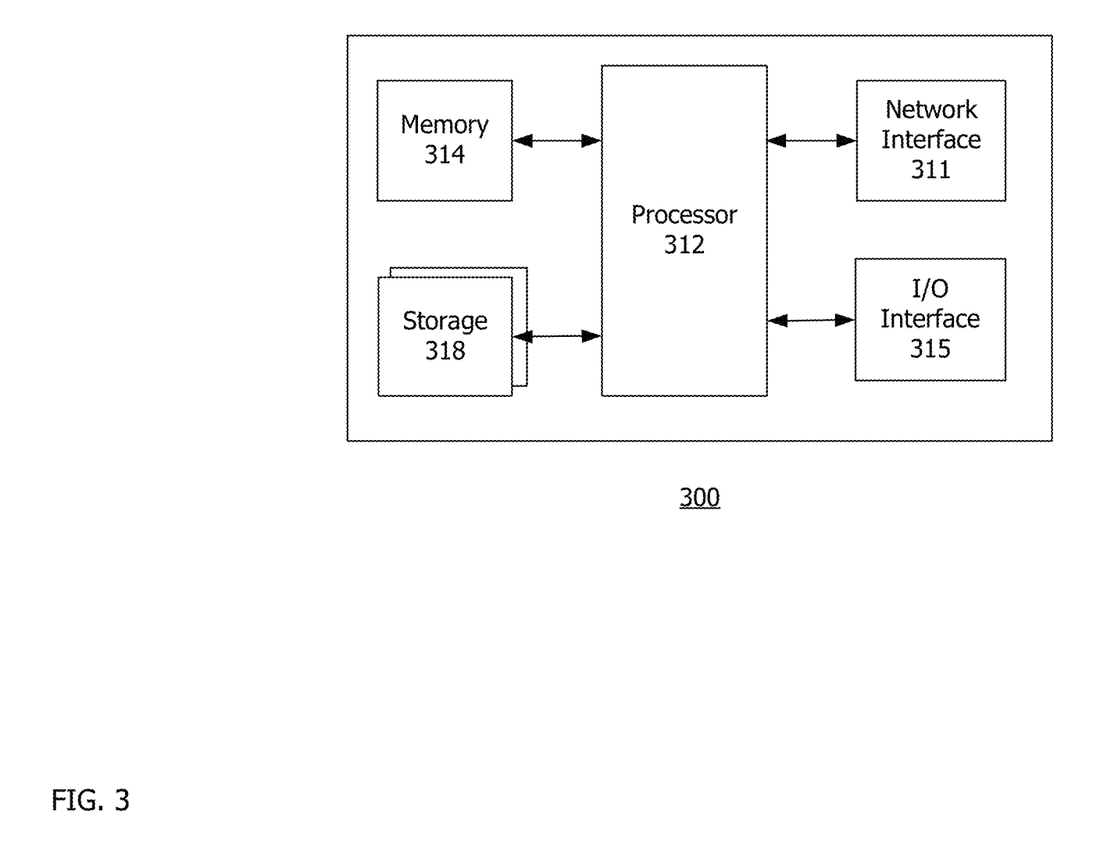
FIG. 3 is a block diagram of a computing device.

Turning now to FIG. 3, there is shown a computing device 300, which is representative of the server computer, and other computing devices discussed herein. The controller 210 of the MFP 200 may also, in whole or in part, incorporate a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 has a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 provides non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 includes an interface to a network such as network 102 (FIG. 1).

The I/O interface 315 interfaces the processor 312 to peripherals (not shown) such as displays, keyboards and USB devices.

Figure 4:
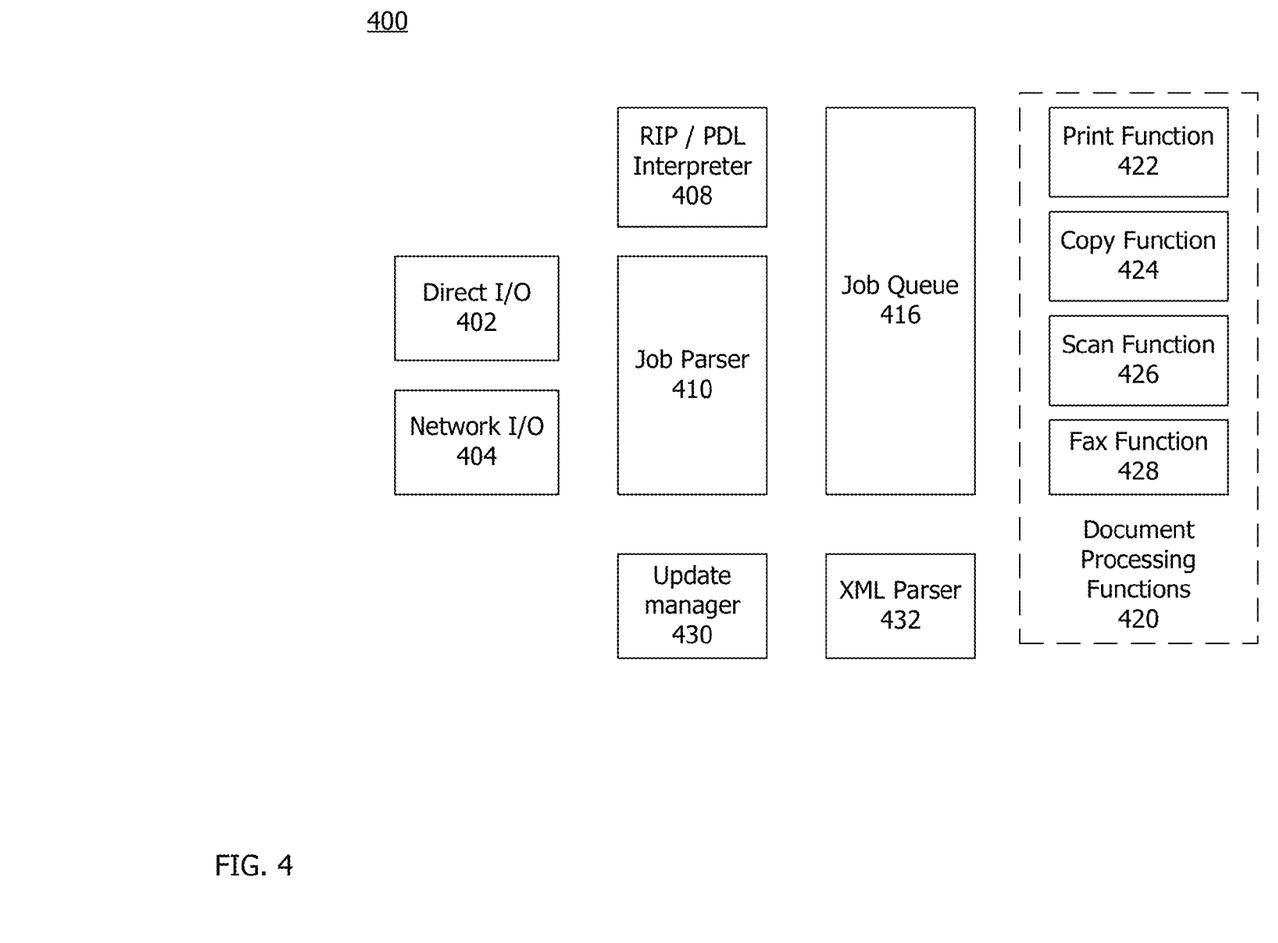
FIG. 4 is a block diagram of a software system for an MFP.

Turning now to FIG. 4 there is shown a block diagram of a software system 400 of an MFP which may operate on the controller 210 of the MFP 200. The system 400 includes client direct I/O 402, client network I/O 404, a RIP/PDL interpreter 408, a job parser 410, a job queue 416, a series of document processing functions 420 including a print function 422, a copy function 424, a scan function 426, a fax function 428, and update manager 430 and an XML parser 432.

The client direct I/O 402 and the client network I/O 404 provide input and output to the MFP controller. The client direct I/O 402 is for the user interface on the MFP, and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP, FTP, UDP, electronic mail TELNET or other network communication protocols.

The RIP/PDL interpreter 408 transforms PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404. The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

The update manager 430 may automatically load and install software/firmware updates for the MFP 400. The update manager 430 may execute an update process that will be discussed in detail subsequently. The update process may be based on an update scheme loaded from a server via the network I/O 404. The update scheme may be, for example, an XML schema, in which case the update manager 430 may include or be coupled to the XML parser 432. The XML parser 432 may extract uniform resource identifiers (URIs) and other data from the XML schema for use by the update manager 430.

Description of Processes

Figure 5:
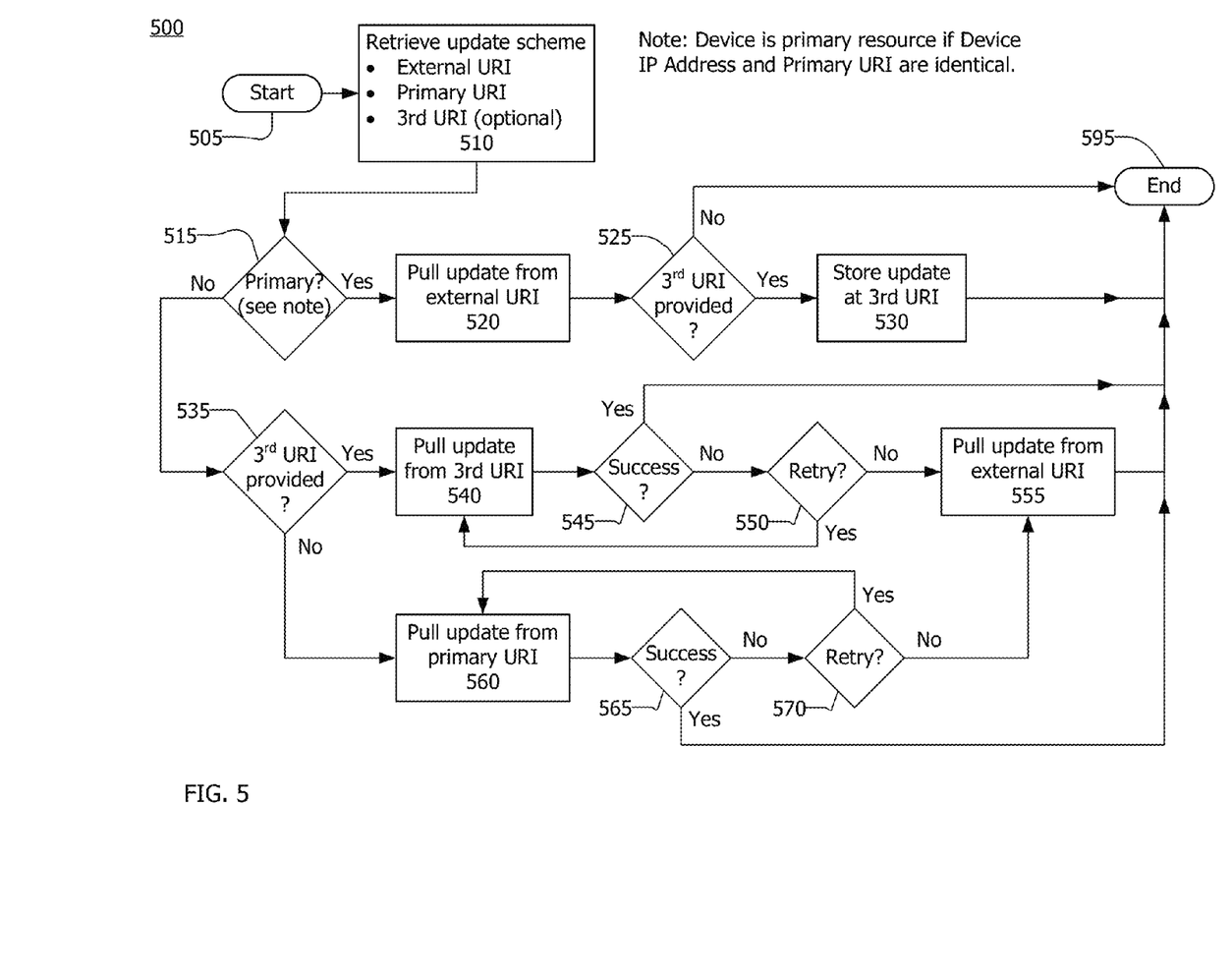
FIG. 5 is a flowchart for updating an MFP.

Turning now to FIG. 5, a process 500 for efficiently acquiring a software/firmware update may start at 505 and end at 595. The process 500 may be performed by a device connected to a private network, such as the devices 112 and 114 connected to the private network 110. The process 500 may be performed by both primary devices and secondary devices, although the actions within the process 500 performed by primary and secondary devices may differ. The process 500 may be performed periodically, such as nightly, weekly, or monthly. The process 500 may be performed when initiated by a network administrator or other user. The process 500 may be performed when the device receives a message indicating that an update is available. Performance of the process 500 may be scheduled or initiated in some other manner.

At 510, the device may retrieve an update scheme including an external URI for a resource external to the private network and a primary URI of a resource on the private network. The update scheme may optionally include a third URI for another resource on the private network and a maximum number of retries. The maximum number of retries may be a positive integer such as one, two, or three. The update scheme may be, for example, an XML schema.

At 510, the device may retrieve the update scheme from memory internal to the device or from source external to the device such as a server or other resource on, or external to, the private network. For example, the device may retrieve the update scheme from an external source every time the process 500 is performed or at periodic intervals, such as weekly or monthly. For further example, the device may retrieve the update scheme from an external source only the first time the process 500 is performed. Thereafter, the update scheme stored in memory within the device may be updated as part of software/firmware updates acquired using the process 500.

The update scheme retrieved at 510 may include an external URI for a resource external to the private network and a primary URI of a resource on the private network. At 515 the device may determine whether or not it is the primary resource. For example, the device may compare its own Internet Protocol address with the primary URI from the update scheme. When the device's Internet Protocol address is identical to the primary URI from the update scheme, the device is the primary resource. When the device's Internet Protocol address is not the same as the primary URI from the update scheme, the device is not the primary resource.

When the device determines that it is the primary resource ("yes" at 515), the device may pull or upload a software/firmware update from the external URI (i.e. from a resource indicated by the external URI) at 520. In some situations, the device may attempt to pull and update from the external URI, but no update may be available. In this situation, the process 500 may end (not shown). At 520, the device may pull more than one software/firmware update, which may be intended for more than one type of equipment. All of the pulled software/firmware updates may be stored, at least temporarily, within the device. When appropriate, at 520 the device may install a pulled update to its own software/firmware.

At 525, the device may determine whether or not the optional third URI is provided in the update scheme retrieved at 510. When the third URI is provided ("yes" at 525), the device may store the pulled software/firmware updates at the third URI at 530. The third URI may be the address of, for example, a shared folder on the private network. In this case, some or all of the pulled updates software/firmware previously stored within the device may be deleted. When the third URI is not provided ("no" at 525), the pulled software/firmware updates stored within the device may be retained and the process 500 may end at 595.

When the device determines that it is not the primary resource ("no" at 515), at 535, the device may determine whether or not the optional third URI is provided in the update scheme retrieved at 510. When the third URI is provided ("yes" at 535), the device may attempt to pull a software/firmware update from the third URI at 540. In some situations, the device may attempt to pull an update from the third URI at 540, but no update may be available. In this situation, the process 500 may end (not shown).

After the device attempts to pull a software/firmware update from the third URI at 540, a determination may be made at 545 whether or not a software/firmware update was successfully pulled. When a software/firmware update was successfully pulled ("yes" at 545), the process 500 may end at 595. When a software/firmware update was not successfully pulled ("no" at 545), a determination may be made at 550 whether or not to repeat attempting to pull the software/firmware update from the 3$^{rd}$ URI at 540. For example, the process 500 may retry the action at 540 a predetermined maximum number of times, such as zero, one, two, or more times. The maximum number of retries may be fixed or a maximum number of retries may be included in the update scheme retrieved at 510. When the maximum number or retries has been attempted without success ("no" at 550) the device may pull the software/firmware update from the external URI at 555. The process 500 may then end at 595.

When the device determines that it is not the primary resource ("no" at 515) and the optional third URI is not provided in the update scheme ("no" at 535), the device may attempt to pull a software/firmware update from the primary URI at 560. In some situations, the device may attempt to pull an update from the primary URI at 560, but no update may be available. In this situation, the process 500 may end (not shown).

After the device attempts to pull a software/firmware update from the primary URI at 560, a determination may be made at 565 whether or not a software/firmware update was successfully pulled. When a software/firmware update was successfully pulled ("yes" at 565), the process 500 may end at 595. When a software/firmware update was not successfully pulled ("no" at 565), a determination may be made at 570 whether or not to repeat attempting to pull the software/firmware update from the primary URI at 560. For example, the process 500 may retry the action at 560 a predetermined maximum number of times, as previously described. When the maximum number or retries has been attempted without success ("no" at 570) the device may pull the software/firmware update from the external URI at 555. The process 500 may then end at 595.

Closing Comments

Throughout this description the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for devices connected to a private network to retrieve software/firmware updates, comprising:

retrieving an update scheme that defines an external Uniform Resource Identifier (URI) for a resource external to the private network and a primary URI for a primary resource connected to the private network;

each device comparing its own Internet Protocol address and the primary URI to determine whether or not a device is the primary resource;

a first device, upon determining that it is the primary resource since its own Internet Protocol address matches the primary URI, attempting to retrieve the software/firmware update from the resource using the external URI; and a second device, upon determining that its own Internet Protocol address does not match the primary URI, attempting to retrieve the software/firmware update from the primary resource, using the Primary URI.

2. The method of claim 1, further comprising:

the first device determining whether or not the update scheme defines a third URI; and when the update scheme defines the third URI, the first device storing the software/firmware update at the third URI.

3. The method of claim 1, further comprising:
the second device determining whether or not the update scheme defines a third URI; and
when the update scheme defines the third URI and the attempt to retrieve the software/firmware update from the primary resource fails, the second device attempting to retrieve the software/firmware update from the third URI.

4. The method of claim 3, further comprising:
if a first attempt to retrieve the software/firmware update from the third URI is unsuccessful, the second device repeating the attempt to retrieve the software/firmware update from the third URI for a maximum number of retries defined in the update scheme.

5. The method of claim 4, further comprising:
if the attempt to retrieve the software/firmware update from the third URI is unsuccessful after the maximum number of retries, the second device attempting to retrieve the software/firmware update from the external URI.

6. The method of claim 4, further comprising:
if the attempt to retrieve the software/firmware update from the third URI is unsuccessful after the maximum number of retries, the second device attempting to retrieve the software/firmware update from the primary URI.

7. The method of claim 3, further comprising:
when the update scheme does not include the third URI, the second device again attempting to retrieve the software/firmware update from the primary URI.

8. The method of claim 7, further comprising:
if a first attempt to retrieve the software/firmware update from the primary URI is unsuccessful, the device repeating the attempting to retrieve the software/firmware update from the primary URI for a maximum number of retries defined in the update scheme, and
if the attempt to retrieve the software/firmware update from the third URI is unsuccessful after the maximum number of retries, the second device retrieving the software/firmware update from the external URI.

9. The method of claim 1, wherein the update scheme is an XML schema.

10. A document processing device, comprising:
a processor;
a network interface coupled to the processor, the network interface connected to a private network; and
storage storing instructions that, when executed by the processor, cause the document processing device to perform actions including:
retrieving an update scheme that defines an external Uniform Resource Identifier (URI) for a resource external to the private network and a primary URI for a primary resource connected to the private network;
comparing its own Internet Protocol address and the primary URI to determine whether or not the document processing device is the primary resource;
upon the document processing device determining that it is not the primary resource because the primary URI does not match its own Internet Protocol address, attempting to retrieve the software/firmware update from the primary URI; and
upon the document processing device determining that it is the primary resource because the primary URI does match its own Internet Protocol address, attempting to retrieve the software/firmware update from the external URI.

11. The document processing device of claim 10, the actions performed further comprising:
upon determining that the document processing device is the primary resource, further determining whether or not the update scheme defines a third URI; and
when the update scheme defines the third URI, storing the software/firmware update at the third URI.

12. The document processing device of claim 10, the actions performed further comprising:
upon determining that the document processing device is not the primary resource, further determining whether or not the update scheme defines a third URI; and
when the update scheme defines the third URI and the attempt to retrieve the software/firmware update from the primary resource fails, attempting to retrieve the software/firmware update from the third URI.

13. The document processing device of claim 12, the actions performed further comprising:
if a first attempt to retrieve the software/firmware update from the third URI is unsuccessful, repeating the attempt to retrieve the software/firmware update from the third URI for a maximum number of retries defined in the update scheme.

14. The document processing device of claim 13, the actions performed further comprising:
if the attempt to retrieve the software/firmware update from the third URI is unsuccessful after the maximum number of retries, retrieving the software/firmware update from the external URI.

15. The document processing device of claim 13, the actions performed further comprising:
if the attempt to retrieve the software/firmware update from the third URI is unsuccessful after the maximum number of retries, retrieving the software/firmware update from the primary URI.

16. The document processing device of claim 12, the actions performed further comprising:
when the update scheme does not include the third URI, again attempting to retrieve the software/firmware update from the primary URI.

17. The document processing device of claim 16, the actions performed further comprising:
if a first attempt to retrieve the software/firmware update from the primary URI is unsuccessful, repeating the attempt to retrieve the software/firmware update from the primary URI for a maximum number of retries defined in the update scheme, and
if the attempt to retrieve the software/firmware update from the third URI is unsuccessful after the maximum number of retries, retrieving the software/firmware update from the external URI.

18. The document processing device of claim 10, wherein the update scheme is an XML schema.

19. The method of claim 1 wherein the software/firmware update is not applicable to the primary resource and is only retrieved by the primary resource for the purpose of updating other, non-primary resources.

20. The document processing device of claim 10 wherein the software/firmware update is not applicable to the primary resource and is only retrieved by the primary resource for the purpose of updating other, non-primary resources.

* * * * *